R. V. R. REYNOLDS.
ENGINEERING INSTRUMENT.
APPLICATION FILED JUNE 1, 1908.
921,889.
Patented May 18, 1909.
2 SHEETS—SHEET 1.
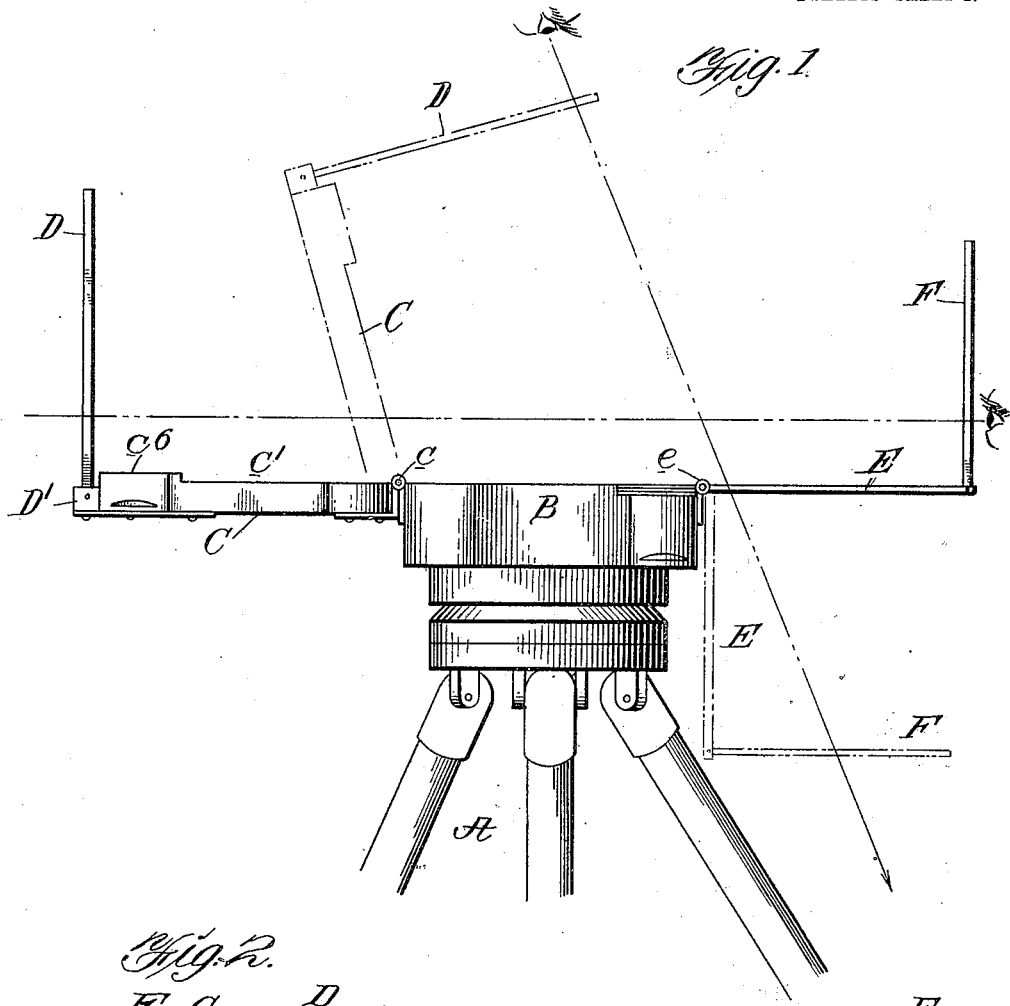
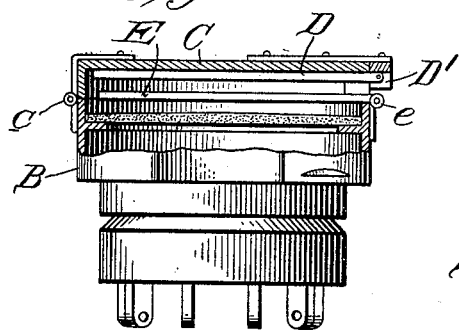
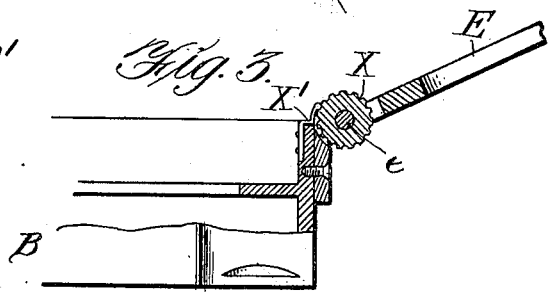
Witnesses:
P. J. Gathmann
M. L. Adams
Inventor:
R. V. R. Reynolds:
By his Attorneys
Baldwin Wight

R. V. R. REYNOLDS.
ENGINEERING INSTRUMENT.
APPLICATION FILED JUNE 1, 1908.

921,889.

Patented May 18, 1909.
2 SHEETS—SHEET 2.

Witnesses:
P. J. Gathmann
M. S. Adams

Inventor:
R. V. R. Reynolds.
By his Attorneys:
Baldwin Wright

UNITED STATES PATENT OFFICE.

ROBERT V. R. REYNOLDS, OF SALT LAKE CITY, UTAH.

ENGINEERING INSTRUMENT.

No. 921,889.      Specification of Letters Patent.      Patented May 18, 1909.

Application filed June 1, 1908. Serial No. 436,114.

*To all whom it may concern:*

Be it known that I, ROBERT V. R. REYNOLDS, a citizen of the United States, residing in Salt Lake City, in the county of Salt Lake and State of Utah, have invented certain new and useful Improvements in Engineering Instruments, of which the following is a specification.

My present improvements relate to the class of engineering instruments shown in my Patent No. 891,952 of June 30, 1908, and the object of my invention is to provide an instrument of this class with improved front and rear sights which are so connected with the instrument that they may not only be readily set to measure either vertical or horizontal angles, but in the latter case enable the operator to sight upon objects at unusually great angles of elevation or depression from the point of observation. This feature is of great value in rough, mountainous country.

In carrying out my invention I connect the front sight by a hinge connection to the instrument so that it may be adjusted to any desired position above the horizontal, and I hinge the rear sight to the instrument in such manner that it may be adjusted to any desired angle below the horizontal whereby the line of sight may be directed either up or down a slope which is practically precipitous.

Figure 4:
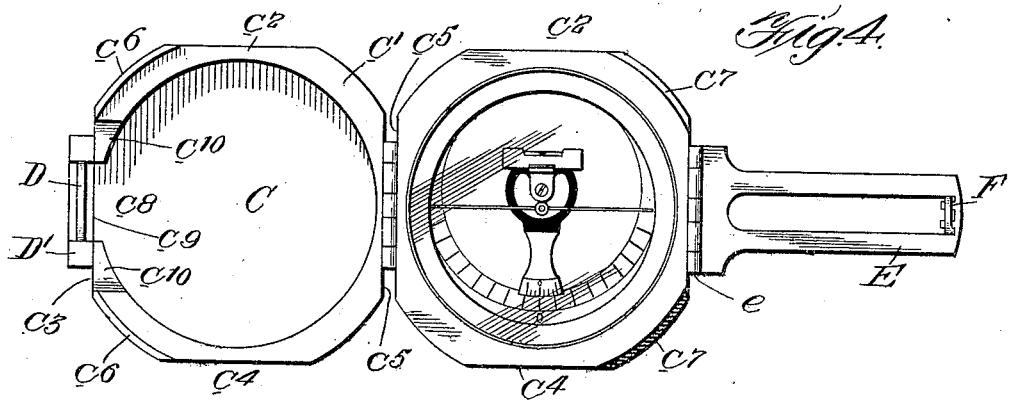
Figure 5:
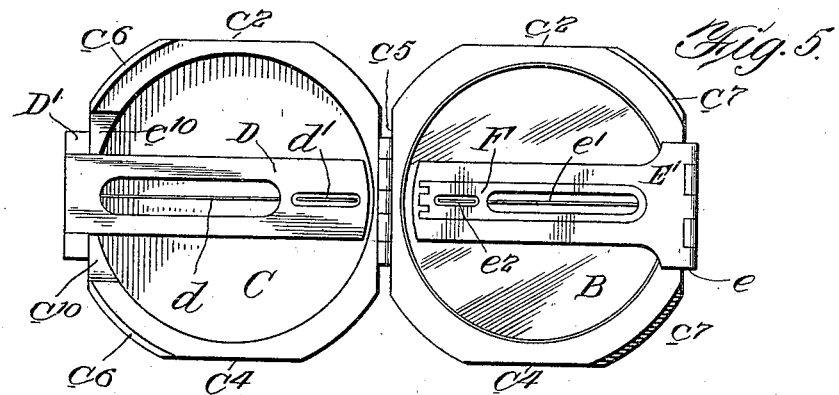
Figure 6:
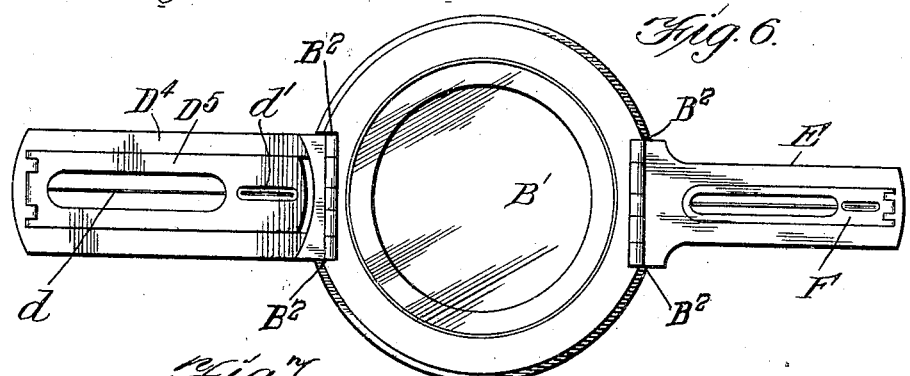
Figure 7:
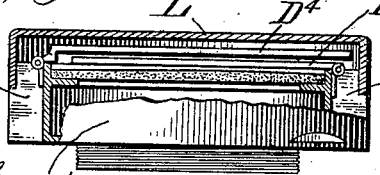

In the accompanying drawings, Figure 1 shows a side elevation of an engineering instrument embodying my improvements, when in use as a compass and mounted on a tripod. Fig. 2 shows a side elevation partly in section with the sights folded. Fig. 3 is a detail view of a hinge that may be employed for connecting the sights with the body of the instrument. Fig. 4 is a plan view of the instrument shown in Fig. 1 with the sights set for measuring horizontal angles. Fig. 5 is a similar view with the sights partially folded. Fig. 6 is a plan view of a modification. Fig. 7 is a view partly in side elevation and partly in section of the instrument shown in Fig. 6 with the sights folded and a lid applied to the box.

I have shown my improvements applied to an instrument of the well-known Brunton type, but modified in accordance with my invention.

In Figs. 1 to 5 I have shown my improvements applied to a compass, the compass box B being shown as supported on a tripod A.

The box shown in Figs. 1, 2, 4, and 5 is provided with a front sight and a rear sight. The front sight is composed of the parts C and D. The part C is hinged to the box at $c$, the joints of the hinge being made close or stiff in order that the part C will remain at any inclination to which it may be set. In this instance the part C constitutes a lid for the box B. The box and the lid are preferably squared or flattened at $c^2$, $c^3$, $c^4$, and $c^5$, and the rim $c'$ projects below the under surface of the lid and is provided with flanges $c^6$ which are adapted to fit the recesses $c^7$ in the box of the compass when the lid is closed. The lid is also formed with a recess $c^8$, which is deepest at $c^9$, the portions $c^{10}$ being slightly shallower than the other part of the recess.

The part D is an arm hinged to a projection D' extending from the edge of the part or lid C in such manner that when the part D is folded it may lie close against the under surface of the part or lid C, being extended through the deep part $c^9$ of the recess $c^8$ in the manner clearly indicated in Figs. 2 and 5. When in this position it will be within the plane of the outer edge of the rim.

The rear sight comprises an arm E and a vane F. The arm E is bifurcated and the vane is hinged to the outer end of the arm in the bifurcation in such manner that it may be folded into it and thus lie in the same plane with the arm. In this way the rear sight may be folded across the top of the compass box and when the lid is closed, the rear sight will lie within the dished or hollow under side of the lid, permitting the latter to be tightly closed onto the compass box, the flanges $c^6$ fitting the recesses $c^7$.

The hinge connection $e$, between the arm E and the compass box, is sufficiently tight or stiff to hold the rear sight in any position to which it may be set, and is also such that not only may the rear sight be folded across the face of the compass box beneath the lid and held horizontally in the manner shown by full lines in Fig. 1, but it may be depressed far below the horizontal in the manner indicated by dotted lines in Fig. 1, thus constituting what I call a drop rear sight.

The part D of the front sight is provided with a sight line or hair $d$ and a sight slit $d'$, and the vane F of the rear sight is provided with a sight line or hair $e'$ and a sight slit $e^2$. As thus constructed it will be observed that the sights may be folded within the lid, which may be tightly closed but readily opened. The sights may be easily extended, in the manner indicated by full lines in Fig. 1, for horizontal measurements and the lid may be lifted and set at any desired angle, in the manner indicated by dotted lines in Fig. 1, and held there. In like manner the rear sight may be dropped or depressed, in the manner indicated in Fig. 1, so that the observer with this light, portable, compact and comparatively inexpensive instrument can take the bearing of an object located at any angle above or below him.

Instead of depending on the use of a hinge working so tightly or stiffly as to hold the sights in their adjusted positions, I may provide a catch or locking device for this purpose. In Fig. 3 I have shown a device which may be employed. It consists of a serrated disk X secured to the sight and co-operating with a spring pawl or catch X' attached to the box. Any other suitable device may be employed for holding the sights in their adjusted positions.

My improvements may also be embodied in an instrument in which the lid is not hinged or which is not provided with a lid. In Figs. 6 and 7 I have shown an instrument of this kind. As illustrated the front and rear sights are hinged to the compass box $B^1$, each of the sights being similar in construction to the rear sights shown in Fig. 5, the front sight consisting of a part $D^4$ hinged to the compass box in such manner that it may be adjusted to any desired extent above the horizontal plane or below it and having a movable interior part $D^5$ hinged to its outer end and carrying a sight line or hair $d$ and a sight slit $d'$. The rear sight E has an interior part F hinged to the outer end of the part E and in like manner being provided with a sight line and a sight slit. The rear sight is also so hinged to the instrument that it may be adjusted to any desired extent either above or below the horizontal plane, the adjustment being the same as that of the rear sight in Figs. 1 to 5 inclusive. The compass box $B^1$ is recessed at $B^2$ as shown in Figs. 6 and 7 which will allow the arms E and $D^4$ to be adjusted to a position below the horizontal. These recesses are formed in the opposite sides of the compass box and are open at their upper and lower ends and also at their outer sides, the arms E and $D^4$ being hinged at the upper edges of the inner walls of the recesses.

A lid L may be employed to cover the sights when they are folded over upon the top of the compass box, but the lid may, of course, be entirely dispensed with.

It will be observed that the instrument shown in Figs. 1 to 5 is the same in principle as that shown in Figs. 6 and 7. The lid marked C in Figs. 1 to 5, corresponds to the part marked $D^4$ in Fig. 6. In Fig. 1 the part C is hinged to the compass box and in Fig. 6 the part $D^4$ is hinged to the compass box. In Fig. 1 the part C carries at its outer end a hinged part D and in Fig. 6 the part $D^4$ carries at its outer end a corresponding hinged part. In either case the front sight is capable of adjustment to any desired extent above a horizontal plane and can be folded down upon the compass box, and the rear sight can not only be folded down upon the compass box, but it can be adjusted to any desired extent below the horizontal plane of the top of the instrument.

I claim as my invention:

1. The combination with an engineering instrument, of two sights hinged thereto and adapted to fold across the top thereof, one of which comprises a part hinged to the instrument and capable of adjustment to any desired position above a horizontal plane and which carries at its outer end a hinged part or vane provided with a sight slit and a sight line, and the other sight comprising an arm hinged to the instrument and capable of being set at different angles both above and below said horizontal plane and which carries a part hinged to the outer end of said last mentioned arm and is provided with a sight slit and a sight line.

2. The combination with an engineering instrument, of a front sight comprising a part hinged to the body of the instrument and capable of being set in different positions above a horizontal plane and which is provided at its outer end with a hinged part or vane capable of being set at different angles and carrying sighting devices, and another sight comprising an arm hinged to the body of the instrument and capable of being set at different angles below said horizontal plane and provided with a hinged part having sighting devices.

In testimony whereof, I have hereunto subscribed my name.

ROBERT V. R. REYNOLDS.

Witnesses:
E. H. CLARK,
R. E. BENEDICT.